July 27, 1926.

A. L. V. C. DEBRIE 1,593,967

METHOD FOR EXPOSING AND PROJECTING CINEMATOGRAPHIC FILMS

Filed Oct. 16, 1922

Inventor:
A.L.V.C. Debrie

Patented July 27, 1926.

1,593,967

UNITED STATES PATENT OFFICE.

ANDRÉ LÉON VICTOR CLEMENT DEBRIE, OF PARIS, FRANCE.

METHOD FOR EXPOSING AND PROJECTING CINEMATOGRAPHIC FILMS.

Application filed October 16, 1922, Serial No. 594,927, and in France December 27, 1921.

My invention relates to a method for exposing cinematographic films so as to project on the screen two images which are thus superposed, but without reducing the images below the normal size. This result is particularly useful for the screen projection of two images whereof one is to serve as a check on the other, for example when it is desired to record the exact time of occurrence of the action represented by an image.

According to this invention, the film is exposed so as to comprise two sets of images in alternate position, two different lenses being used to take the two sets of images on the band which are then to be projected on the screen at the same time. In the said example, one set represents a very near view, whilst the other set is a distant view taken in normal conditions.

The method as applied to a cinematographic machine gun is of particular interest. It has been proposed for the training of pilots mounted on war aeroplanes, to replace the machine gun by a cinematographic camera wherein the sensitive film is provided at each point corresponding to an image with a set of concentric circles after the manner of a target. The pilot pursues his adversary and operates the camera device exactly as for a machine gun, and his skill in firing can be judged by the position of the enemy's aeroplane upon the said target.

But in order that these indications should have the desired value, it becomes necessary to find out by inspection of the film the exact time when the enemy's aeroplane has come upon the target. In this manner it can be ascertained whether the pilot has not "brought down" the enemy after he has himself been placed out of combat by the latter. A rapid estimate can also be made of the time during which the pilot has kept the aeroplane on his target, this being a very important indication as concerns the skill of the pilot.

For this purpose the film has two alternate sets of images which are taken at the same time; one set of images represents the said target and the aeroplane which occupies various positions thereon while in the field of the lens, and the other set of images is taken at a short distance by a second lens and represents a watch.

Figures 1, 3:
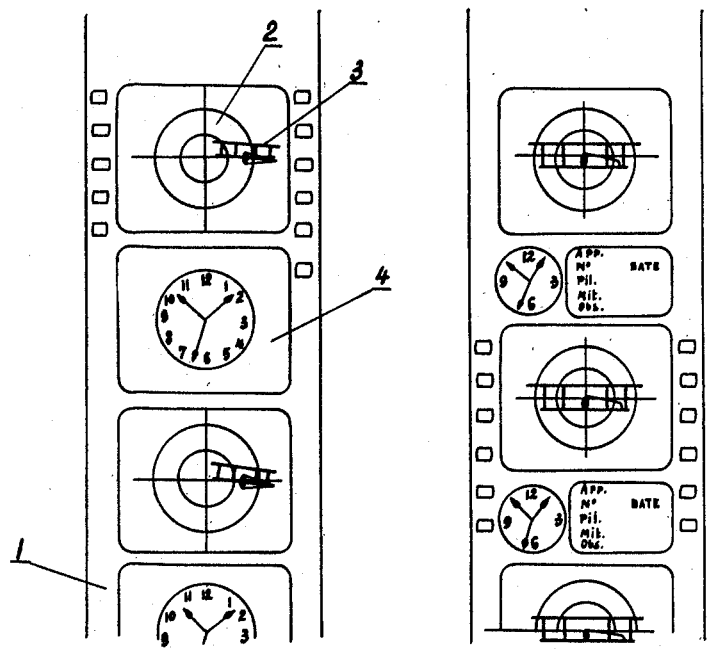
Fig. 1 shows by way of example a film exposed according to the invention which is used in a cinematographic machine gun.
Fig. 3 is a modified form of the film shewn in Fig. 1.

The film 1, Fig. 1, has two alternate sets of images one set comprising the target 2 upon which is shewn the aeroplane 3 when the latter is in the field of the corresponding lens, and the other set representing a watch 4 which is running. All these images have the size of the normal cinematographic image. When upon the screen, it is obvious that the two images are projected one after the other, but by reason of the speed of travel of the film, they will be seen as exactly superposed.

Figure 2:
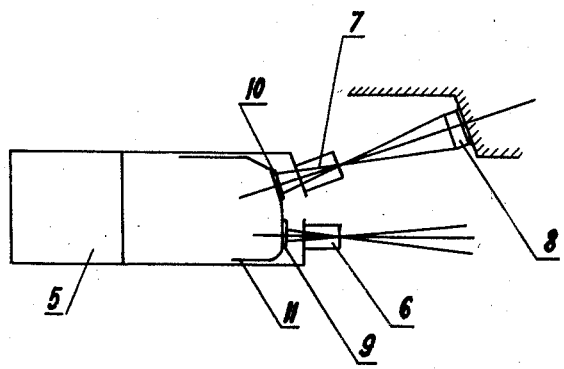
Fig. 2 is a diagrammatic view showing the use of the camera for taking the two sets of images.

For taking the images on the film, Fig. 2, the machine gun camera 5 comprises two lenses, one 6 for distant views and a second 7 used to photograph a watch 8 which is very near the same. Each lens thus produces at the same time a respective image 9, 10 on the film 11 which travels in the camera.

In addition to the watch whose indications vary at each instant, the lens used for the near views may photograph a table containing any given indications such as the date, the number of the aeroplane, names of the pilot and gunner, and the like, whereby all fraud on the part of persons under the training will be avoided. In this case the film has the appearance shewn in Fig. 3.

What I claim is:

1. An ordinary cinematographic film the marginal perforations whereof show a constant spacing throughout the length of the film, comprising two varieties of images corresponding each to a different object and taken each with an objective of different focal length, each image of each variety covering the whole width of the film and being disposed between two images of the other and being taken simultaneously with one of these adjacent pictures.

2. An ordinary cinematographic film the marginal perforations whereof show a constant spacing throughout the length of the film comprising two varieties of images, the first showing a watch and the second a moving target each of which is taken with an objective of different focal length, each image of each variety covering the whole width of the film and being disposed between two images of the other and being taken simultaneously with one of these adjacent pictures.

3. A method for producing combined cinematographic images comprising the simultaneous taking of two series of images of two different objects through two objectives of different focal length on two picture areas following each other on the same ordinary film, each area being exposed only once and projecting the film thus exposed in the normal manner whereby a single series of images showing the superposition of the simultaneous positions of the two objects is produced on the screen due to the persistance of visual sensation.

4. A method for checking the firing of a machine gun on board an aircraft comprising the simultaneous taking of two series of images of a watch and of a target through two slightly divergent objectives of different focal length on two picture areas following each other on the same ordinary film, each area being exposed only once and the projection through an ordinary apparatus of the film thus exposed.

In witness whereof I have hereunto set my hand.

ANDRÉ LÉON VICTOR CLEMENT DEBRIE.